United States Patent
Bernhardsgrütter et al.

(10) Patent No.: US 11,988,535 B2
(45) Date of Patent: May 21, 2024

(54) THERMAL FLOW SENSOR AND METHOD FOR OPERATING SAME

(71) Applicant: Innovative Sensor Technology IST AG, Ebnat-Kappel (CH)

(72) Inventors: Ralf Emanuel Bernhardsgrütter, Sulgen (CH); Christoph Hepp, Wil (CH)

(73) Assignee: Innovator Sensor Technology IST AG, Ebnat-Kappel (CH)

( * ) Notice: Subject to any disclaimer, the term of this patent is extended or adjusted under 35 U.S.C. 154(b) by 73 days.

(21) Appl. No.: 17/999,509

(22) PCT Filed: Apr. 23, 2021

(86) PCT No.: PCT/EP2021/060729
§ 371 (c)(1),
(2) Date: Nov. 21, 2022

(87) PCT Pub. No.: WO2021/239349
PCT Pub. Date: Dec. 2, 2021

(65) Prior Publication Data
US 2023/0236052 A1      Jul. 27, 2023

(30) Foreign Application Priority Data

May 29, 2020   (DE) ..................... 10 2020 114 487.3

(51) Int. Cl.
*G01F 1/696*      (2006.01)
*G01F 1/7084*    (2022.01)

(52) U.S. Cl.
CPC .......... *G01F 1/7084* (2013.01); *G01F 1/6965* (2013.01)

(58) Field of Classification Search
CPC ...... G01F 1/7084; G01F 1/6965; G01F 1/712; G01F 1/7044; G01F 25/10; G01F 1/6986
See application file for complete search history.

(56) References Cited

U.S. PATENT DOCUMENTS 10,613,045 B2 *   4/2020   Badarlis ................. G01K 17/00
11,300,461 B2 *   4/2022   Badarlis ................. G01N 25/18
(Continued)

FOREIGN PATENT DOCUMENTS

DE   102014115566 A1   5/2015
DE   112016000872 B4   7/2022
EP      3106851 A1   12/2016

OTHER PUBLICATIONS

Badarlis, A. et al., Measurement of Gas Thermal Properties Using the Parametric Reduced-Order Modeling Approach, IEEE Sensors Journal, Jun. 15, 2016, pp. 4704-4714, vol. 16, No. 12.

*Primary Examiner* — Freddie Kirkland, III
(74) *Attorney, Agent, or Firm* — Christopher R. Powers; Endress+Hauser (USA) Holding, Inc.

(57) ABSTRACT

A method for operating a thermal flow sensor includes: bringing a measuring medium into thermal contact with a sensor element of the flow sensor and periodically heating the medium using an AC voltage introduced into the sensor element; simultaneously detecting a maximum amplitude of a temperature and/or a phase shift between a curve of the AC voltage and the curve of the temperature; adjusting the detected maximum amplitude and/or the detected phase shift using calibration data; determining an isoline using the adjusted maximum amplitude and/or the adjusted phase shift based on model of the flow sensor, wherein the isoline has a plurality of value pairs of thermal conductivity and thermal capacitance of the medium; deriving a medium information from the isoline; and performing a flow measurement by converting signal values from the sensor element into measurement values of an effective flow velocity of the medium using the medium information.

14 Claims, 3 Drawing Sheets

(56) References Cited

U.S. PATENT DOCUMENTS

| | | | |
|---|---|---|---|
| 11,674,833 B2* | 6/2023 | Hornung | G01F 1/7084 73/861.95 |
| 2018/0172610 A1* | 6/2018 | Badarlis | G01K 17/00 |

* cited by examiner

THERMAL FLOW SENSOR AND METHOD FOR OPERATING SAME

CROSS-REFERENCE TO RELATED APPLICATIONS

The present application is related to and claims the priority benefit of German Patent Application No. 10 2020 114 487.3, filed on May 29, 2020, and International Patent Application No. PCT/EP2021/060729, filed Apr. 23, 2021, the entire contents of which are incorporated herein by reference.

TECHNICAL FIELD

The invention relates to a method for operating a thermal flow sensor, wherein the thermal flow sensor has at least one sensor element and an electronics unit. Furthermore, the invention relates to a thermal flow sensor which is designed to be operated by means of the method according to the invention.

BACKGROUND

Thermal flow sensors are known for determining a flow rate or the flow velocity of a measuring medium, or a fluid, e.g., a gas, a gas mixture, or a liquid. These make use of the fact that a (flowing) measuring medium transports heat away from a heated surface. Thermal flow sensors are typically composed of several functional elements, usually at least one low-impedance heating element and one high-impedance resistance element, which serve as a temperature sensor. Alternatively, thermal flow sensors are composed of several low-impedance heating elements, serving as heaters and temperature sensors.

Calorimetric thermal flow sensors determine the flow or flow rate of the fluid in a channel by way of a temperature difference between two temperature sensors, which are arranged downstream and upstream of a heating element. For this purpose, use is made of the fact that, up to a certain point, the temperature difference is linear with respect to the flow or the flow rate. This procedure or method is described extensively in the relevant literature.

Anemometric thermal flow sensors consist of at least one heating element, which is heated during the measurement of the flow. As a result of the measuring medium flowing around the heating element, heat transport into the measuring medium takes place, which changes with the flow velocity. The flow velocity of the measuring medium can be inferred by measuring the electrical variables of the heating element.

Such an anemometric thermal flow sensor is typically operated in one of the following two control types:

In the "constant current anemometry" (CCA) control type, a constant current is applied to the heating element. The measuring medium flowing around causes the resistance of the heating element to change, and thus the voltage to drop at the heating element, which represents the measuring signal. The "constant voltage anemometry" (CVA) control type functions similarly thereto, with a constant voltage being applied to the heating element.

In the "constant temperature anemometry" (CTA) control type, the heating element is maintained at a temperature that, on average, is constant. Relatively high flow velocities can be measured by means of this control type. Depending upon the flow velocity, more or less heat is transported away by means of the flowing measuring medium, and, accordingly, more or less electrical power must be fed in in order to keep the temperature constant. This fed-in electrical power is a measure of the flow velocity of the measuring medium.

However, the amount of heat transported away in anemometric or calorimetric thermal flow sensors is dependent upon thermal parameters of the measuring medium, primarily the thermal conductivity and the heat capacity of the measuring medium. Accordingly, the thermal flow sensor must be calibrated in advance in a special calibration device for a specific measuring medium. If the measuring medium changes, the thermal flow sensor must be calibrated again in the calibration device before it outputs correct values again.

There are already measuring principle approaches for membrane flow sensors for gas, which measure thermal conductivity and heat capacity in a first step (by means of constant power or driven by alternating current) and use this information in the measurement of the flow velocity to compensate for the fluid dependence in a second step. Often, however, specific information about the property of the gas is required a priori in order for this self-calibration to work.

Furthermore, the thermal conductivity and the heat capacity of the measuring medium must often be measured separately or be known. This separate determination frequently also requires different measurement conditions or measurement sequences, which makes it more complicated to carry out, i.e., several steps, different sensors, and electronic components may be required. Such a complex implementation can often lead to higher production costs and thus also to higher prices.

SUMMARY

Proceeding from this problem, the object of the invention is to provide a method which makes it possible to calibrate a sensor for a specific measuring medium without the properties of the measuring medium being known a priori.

The object is achieved by a method for operating a thermal flow sensor, wherein the thermal flow sensor has at least one sensor element and an electronics unit, said method comprising:
bringing a measuring medium into thermal contact with the sensor element and periodically heating the measuring medium using an AC voltage introduced into the sensor element, wherein a maximum amplitude of a curve of the temperature and/or a phase shift between the curve of the AC voltage and the curve of the temperature is simultaneously detected;
adjusting the detected maximum amplitude and/or the detected phase shift using calibration data;
determining an isoline using the adjusted maximum amplitude and/or the adjusted phase shift on the basis of a mathematical or physical model of the thermal flow sensor, wherein the isoline has a plurality of value pairs of thermal parameters, especially thermal conductivity and heat capacity, of the measuring medium, said value pairs being associated with the same maximum amplitude or the same phase shift;
deriving at least one piece of measuring fluid information from the isoline; and
carrying out a flow measurement using the thermal flow sensor, wherein the sensor element provides signal values, and converts the signal values into measurement values of the effective flow velocity of the measuring medium using the measuring fluid information.

The advantage of the method according to the invention is that the dependence of the measured flow velocity upon the measuring medium can be compensated for directly, unlike in conventional thermal flow sensor operating methods. For this purpose, a so-called "3-omega method" is used, by means of which a maximum amplitude and/or a phase shift is determined. These values are compensated for by means of calibration values which are determined, especially, by the manufacturer. Subsequently, a so-called "isoline" of the heat capacity and thermal conductivity is determined. An isoline represents the value pairs of the heat capacity and thermal conductivity for which the measured and compensated maximum amplitude or phase shift is equal. This can apply to several different measuring media, and therefore the measuring medium itself does not have to be determined, but only the underlying behavior thereof in relation to the isoline.

The model used for determining the isoline is based upon the thermal conduction equation. This isoline can be fed into a second model, which is used to convert the signal values into measurement values of the flow velocity. A more detailed explanation follows in the description of the figures. Since the measuring medium itself does not have to be determined—and, for this purpose, in each case the heat capacity and thermal conductivity thereof—the method according to the invention is advantageous in contrast to the known methods in terms of effort and costs.

The term, "flow velocity," also includes the volumetric flow rate of a measuring medium.

According to an advantageous embodiment of the method according to the invention, the calibration data are determined beforehand with a known measuring medium with a defined value pair of thermal parameters, especially water, wherein the determination of the calibration data comprises detecting a reference maximum amplitude of a curve of the temperature and/or a reference phase shift between the curve of the AC voltage and the curve of the temperature. A so-called "3-omega method" is also used for this purpose, by means of which the reference values are determined.

According to an advantageous embodiment of the method according to the invention, a flow velocity of the measuring medium is zero for detecting the maximum amplitude and/or the phase shift and for determining the calibration data. Conditions in which the flow velocity of the measuring medium is not equal to zero may also exist. However, the determination of the isoline is then much more complex or time-consuming.

The determination of the calibration data may also comprise a two-point calibration. For example, a measurement at the described flow velocity of zero and a measurement at a finite flow value are carried out.

According to an advantageous embodiment of the method according to the invention, the calibration data are stored in the electronics unit. As described above, the calibration data are preferably determined by the manufacturer. In order for the customer or the user to be able to carry out the subsequent steps of the method, the calibration data must be made available to them. Therefore, said calibration data should be stored directly in the electronics unit of the thermal flow sensor, whereupon they can be read out by the customer or by the user.

According to an advantageous embodiment of the method according to the invention, the flow measurement is carried out by means of a constant temperature anemometry method. As described above, a constant current is applied to a heating element of the thermal flow sensor. The measuring medium flowing around causes the resistance of the heating element to change, and thus the voltage to drop at the heating element, which represents the measuring signal.

According to an advantageous embodiment of the method according to the invention, the steps of determining the isoline and the derivation of the measuring fluid information from the isoline are repeated in the event that one or more of the following cases occur:
  a switch or change of the measuring medium;
  a check of the sensor element with respect to soiling;
  a change in the composition of the measuring medium, especially by decomposition of the measuring medium.

These are situations which occur during operation and for which the thermal flow sensor does not have to be returned to the manufacturer. In other words, the calibration data still remain valid, and therefore only the behavior between the thermal flow sensor and the measuring medium has to be re-evaluated by determining a new isoline.

According to an advantageous embodiment of the method according to the invention, the steps of determining the calibration data, determining the isoline, and deriving the measuring fluid information from the isoline are repeated in the event that a fault occurs in the thermal flow sensor. If the thermal flow sensor is still functional despite the fault, it may have a changed sensor element characteristic. In this case, the thermal flow sensor should be sent to the manufacturer so that the manufacturer can repeat the step of determining the calibration data.

According to an advantageous embodiment of the method according to the invention, the thermal flow sensor, for determining the calibration data, is connected, especially temporarily, to a calibration device, wherein the calibration device has a pipeline or a channel, and a pump element, and the pump element establishes a flow through the pipeline or channel with the known measuring medium with the defined value of the flow velocity. By means of this calibration device, which is provided, especially, by the manufacturer, defined states or values of the flow velocity of the known measuring medium can be generated, such that the calibration data of the thermal flow sensor can be determined in a highly accurate manner.

According to an advantageous embodiment of the method according to the invention, the thermal flow sensor, in order to determine the isoline and carry out the flow measurement, is mounted on a pipeline, through which the measuring medium flows, or a channel of a measuring point. The determination of the isoline can thus advantageously take place directly at the installation location provided for operation of the thermal flow sensor and does not require any further special measuring equipment. It is therefore not necessary to remove the sensor in order to possibly change the measuring medium or to check the sensor and/or the measuring medium.

According to an advantageous embodiment of the method according to the invention, the step of detecting the maximum amplitude or the phase shift is repeated periodically, and a warning is generated by the electronics unit when the respectively detected maximum amplitudes or phase shifts differ from one another by more than a predetermined factor. The thermal flow sensor thus has a self-checking function or enables predictive maintenance, since deviations from the regular or known measurement values are detected. As a result, the user can also be shown when, as described above, there is a change in the behavior between the thermal flow sensor and the measuring medium, and that the isoline should be redetermined.

Furthermore, the object is achieved by a thermal flow sensor which is designed to be operated by means of the method according to the invention. It is essential for the thermal flow sensor to be very sensitive and to have a short response time, e.g., by means of a simplified layer structure, which also simplifies the mathematical model of the thermal flow sensor and reduces the associated uncertainties.

BRIEF DESCRIPTION OF THE DRAWINGS

The invention is explained in greater detail with reference to the following figures, in which.

DETAILED DESCRIPTION

Figure 1:
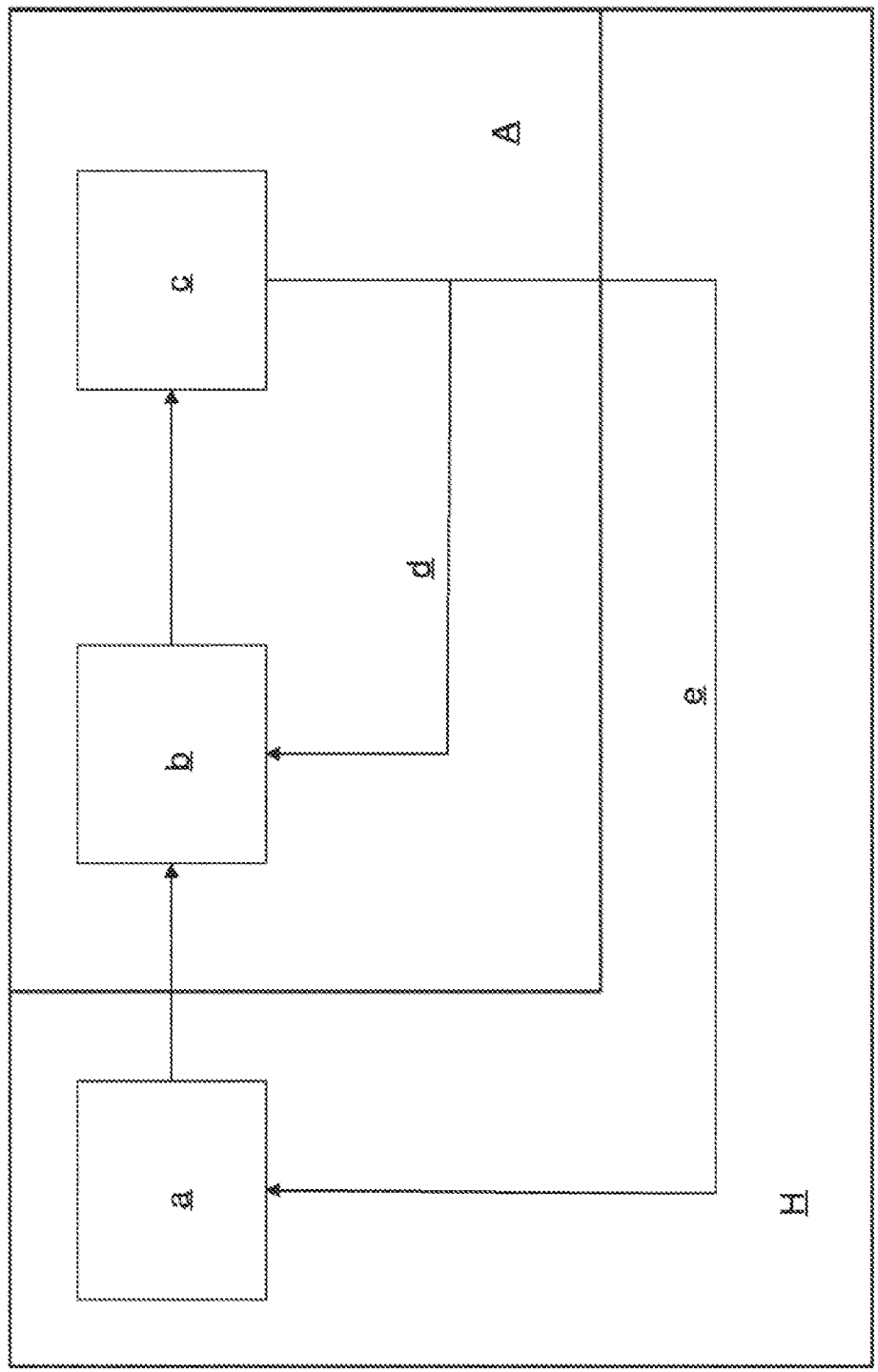
FIG. 1 shows an overview of the method according to the present disclosure.

FIG. 1 shows a flowchart of an embodiment of the method according to the invention. The method is used to calibrate a thermal flow sensor 100 on a second measuring medium 2 for an application of a user A.

The first method step a is carried out by the manufacturer H or by a calibration service. The thermal flow sensor 100 is connected to a calibration device. The calibration device has a pipeline or a channel, and a pump element. The pump element is designed to establish a flow through the pipeline or channel with a known measuring medium with a defined value of a flow velocity. The composition of the first measuring medium and the thermal parameters thereof are known. For example, the measuring medium is water. The thermal conductivity and the heat capacity of a measuring medium, for example, are particularly relevant as thermal parameters for the method according to the invention.

For the recording of calibration data, a test of the alternating current of the thermal flow sensor 100 is conducted. Here, an alternating current signal is applied to the sensor element 101, 102, 103, and, at the same time, the voltage drop across the sensor element 101, 102, 103 is detected. Here, a reference maximum amplitude of a curve of the temperature and/or a reference phase shift between the curve of the AC voltage and the curve of the temperature is detected.

This alternating current test can be implemented, for example, by means of a lock-in method.

Said calibration data are stored in an electronics unit of the thermal flow sensor 100. Subsequently, the thermal flow sensor 100 is removed from the calibration device and transferred to the user A. The user A then installs the thermal flow sensor 100 at a measuring point, where the thermal flow sensor 100 serves the purpose of determining the flow velocity of a measuring medium 2 which flows through a pipeline or a channel of the measuring point. The thermal parameters of the measuring medium 2 are, especially, not known.

In a second method step b, the second measuring medium 2 is characterized. In this example, the second measuring medium 2 is an oil of unknown composition. For this purpose, the so-called "3-omega method" is used, wherein the flow velocity of the second measuring medium is zero during this method step b. A sensor element 101, 102, 103 of the thermal flow sensor 100 is periodically excited with an AC voltage or alternating current and acts as a heating element. A heat pulse is thereby periodically induced into the second measuring medium 2. At the same time, the temperature of the sensor element is determined. By comparing the excitation signal with the temperature signal, especially the third harmonic oscillation thereof, a maximum amplitude of a curve of the temperature and/or a phase shift between the curve of the AC voltage and the curve of the temperature can be determined. Subsequently, this measured maximum amplitude or the measured phase shift is adjusted by means of the calibration data.

Figure 2:
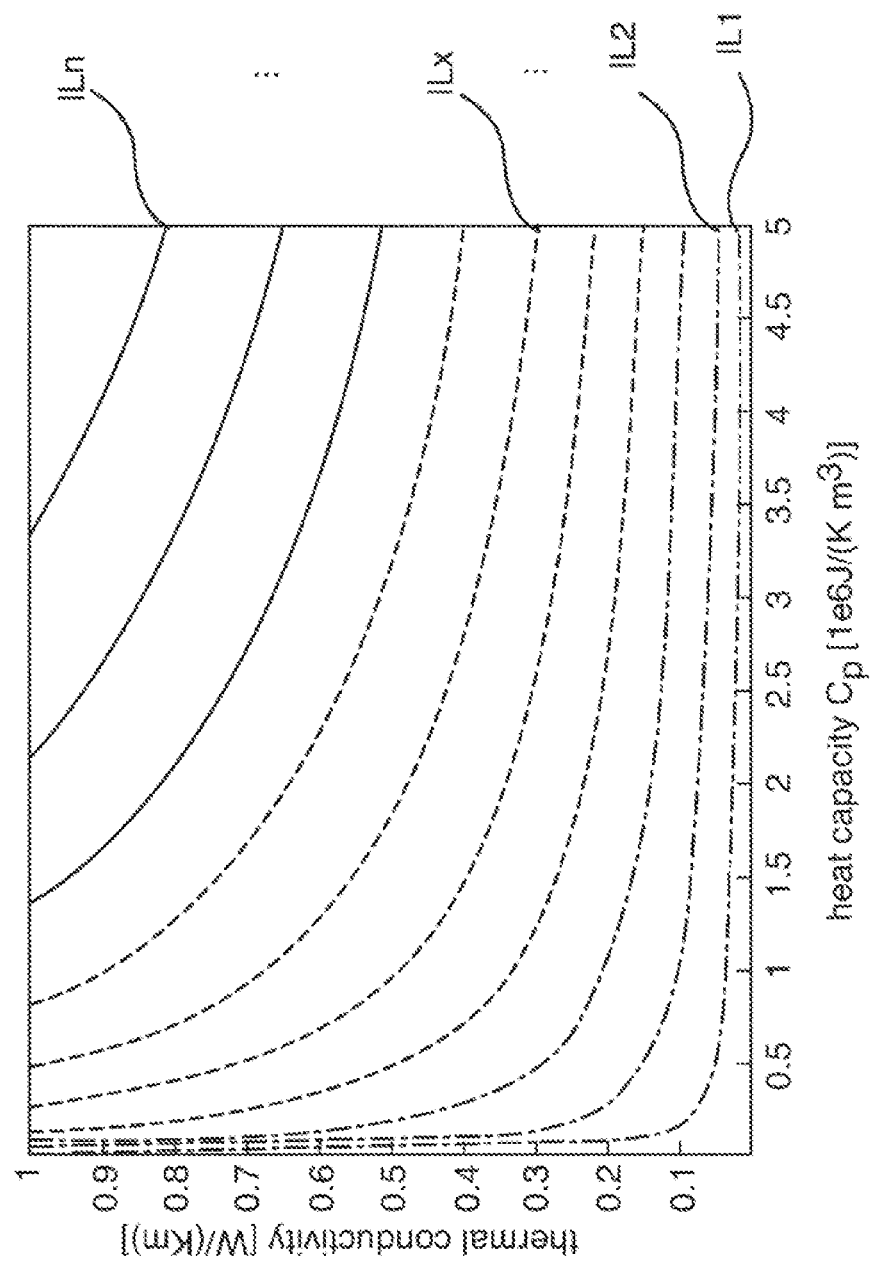
FIG. 2 shows a graph with isolines for various values of measuring signals.

Subsequently, an isoline ILx is determined using the adjusted maximum amplitude or the adjusted phase shift. FIG. 2 shows a graph with a plurality of such isolines IL1, IL2, ..., ILx, ILn for liquids. The curve profiles may be different for gases, for which the method according to the invention can also be carried out. The x-axis represents the heat capacity Cp, while the y-axis represents the thermal conductivity k. An isoline IL1, IL2, ..., ILx, ILn is now a plurality of value pairs of the heat capacity Cp and thermal conductivity k for which the adjusted maximum amplitude or the adjusted phase shift assumes the same value. The isolines IL1, IL2, ..., ILx, ..., ILn are based upon a mathematical model $f(k,c_p)$, where k denotes the thermal conductivity, and Cp denotes the heat capacity. The purpose of this model is to describe the physical behavior of the temperature during periodic heating. This model is based upon the thermal conduction equation:

$$\frac{dT}{dt} - \frac{k}{\rho c_p}\Delta T = 0,$$

where ρ denotes the density.

Mathematically speaking, an isoline (of the first model) is defined as $\forall\ k,c_p | f(k,c_p) = $const.

For the present example, it is assumed that the isoline ILx is determined using the adjusted measured maximum amplitude or the measured phase shift.

In the method step c, the isoline Ilx is transferred to a "constant temperature anemometry" flow measurement. For this purpose, a piece of measuring medium information is derived from the isoline Ilx. Subsequently, the flow measurement is carried out by means of the thermal flow sensor 100. In the process, the sensor element 101, 102, 103 provides signal values which are converted into measurement values of the effective flow velocity of the measuring medium 2 by means of the measuring fluid information.

Specifically, a second mathematical model (for constant temperature anemometers) $g(k,c_p)$ is used for this purpose. The purpose of this model is to describe the energy/power required during the constant temperature anemometry. This model is based, especially, upon energy conservation with forced convection, which is defined as follows:

$$\frac{dE}{dt} = \dot{m}c_p(T_{medium,out} - T_{medium,in}) = h(k, c_p)A(T_{heater} - T_{medium,in}).$$

where E denotes the energy used, ṁ denotes the mass flow rate, $T_{medium,in}$ denotes the temperature of the medium when it reaches the heater, $T_{medium,out}$ denotes the temperature of the medium downstream of the heater and T heater denotes the temperature of the heater, h denotes the heat transfer coefficient, and A denotes the cross-sectional area of the channel/pipe.

The second model also includes an isoline that is defined as $\forall k,c_p | g(k,c_p) =$const and is referred to as "further isoline."

The decisive observation, which was determined experimentally, is now as follows:

$$\forall k,c_p | f(k,c_p)=\text{const} \rightarrow g(k,c_p) \approx \text{const}$$

The ≈ symbol is intended to symbolize the "similarity" between the two models f and g. Based upon the equation 1, there is no difference between the parameters $(k, c_p)$ of the first isoline ILx and the further isoline.

The method step d makes it possible to readjust the thermal flow sensor to a changed measuring medium 2 or, for example, in the event of a deposit forming on one of the sensor elements 101, 102, 103. For this purpose, the method steps b and c are repeated, and a new isoline ILx is determined thereby. It is possible to redetermine the maximum amplitude or the phase shift at regular intervals and to examine it for deviations. In the event of a deviation, this can be indicated to the user so that said user initiates the further steps. Alternatively, the method steps b and c can be performed automatically.

The method step e allows the thermal flow sensor 100 to be characterized and calibrated completely anew when there is a fault which changes the measuring properties of the thermal flow sensor 100, but does not adversely affect the functionality of the thermal flow sensor 100. For this purpose, the method steps a through c are repeated, wherein the thermal flow sensor 100 is transferred at least temporarily to the manufacturer H or to a calibration service.

Figure 3:
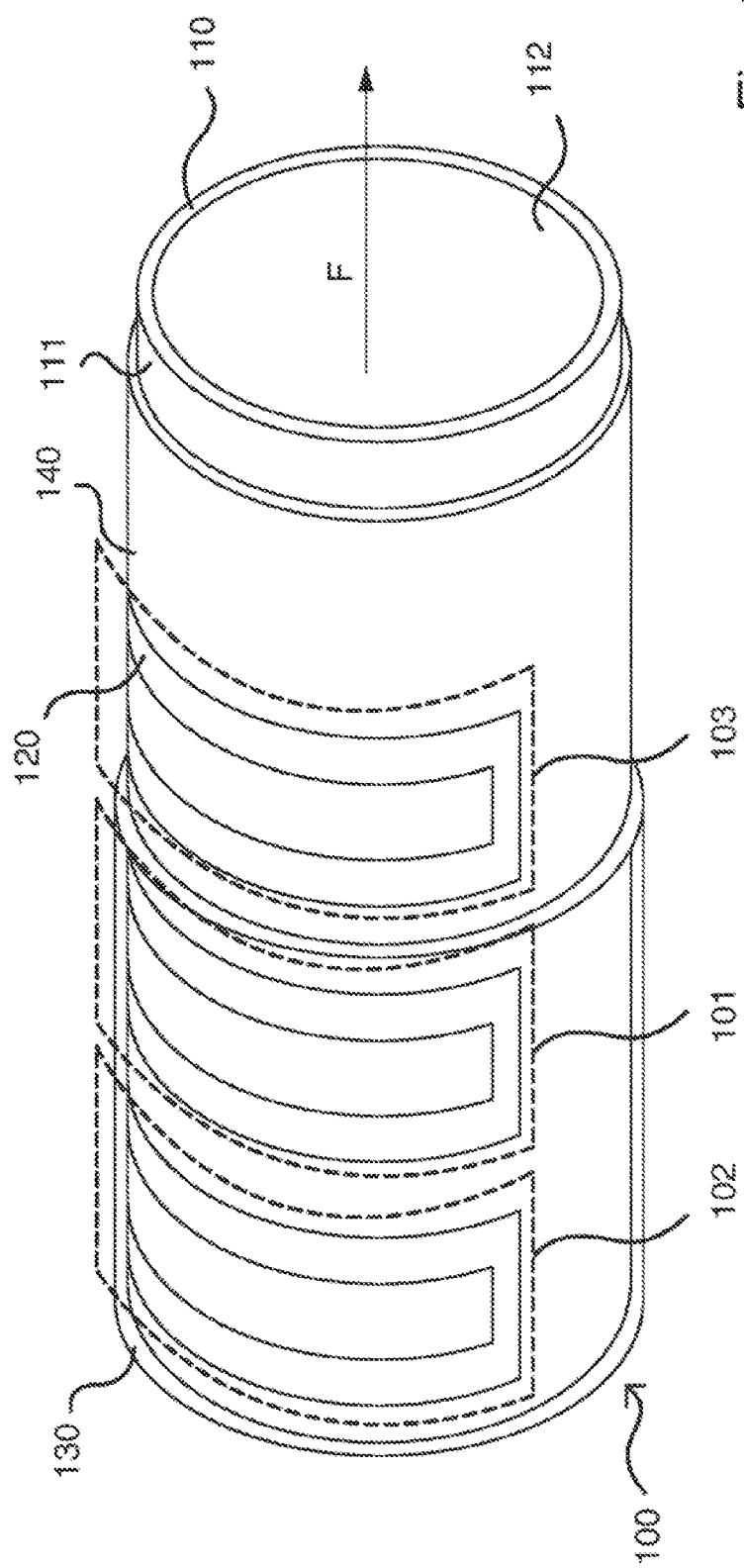
FIG. 3 shows an exemplary embodiment of a thermal flow sensor according to the present disclosure.

It is essential for the thermal flow sensor used to be very sensitive and to have a short response time. FIG. 3 shows an embodiment of a thermal flow sensor 100 of this kind according to the invention. FIG. 3 is an isometric view of the thermal flow sensor 100, including a partial cross-section orthogonal to a flow direction F of the measuring medium 2 through the support element 110 of the thermal flow sensor 100.

A tube through which a measuring medium 2 can flow in a flow direction F is used as the support element 110. The support element 110 consists of a metallic material, especially stainless steel, and has, for example, a wall thickness of 150 μm.

An electrical insulation layer 140 is applied to a first surface 111, facing away from the measuring medium, of the support element by means of a thin-film method. The electrical insulation layer 140 in this example is a ceramic material, e.g., $Al_2O_3$, with a layer thickness of approx. 2 μm.

A functional layer 120 consisting of platinum is subsequently applied to the electrical insulation layer 140. The functional layer is applied by means of a thin-film method, e.g., sputtering or vapor deposition, and has a layer thickness of about 800 nm. The electrical insulation layer provides the electrical insulation between the functional layer 120 and the support element. The electrical insulation layer 140 and the functional layer 120 have substantially the same convex curvature as the first surface 111.

In a subsequent method step, the functional layer is structured by means of a laser ablation method. In this case, a laser successively ablates the material of the functional layer, thus forming the structures of sensor elements 101, 102, 103. For example, these structures are resistor structures. The resistor structure is used to determine the temperature of the measuring medium. For this purpose, the resistance value of the resistor structure can be measured. The measured resistance value is directly proportional to the temperature at the resistor structure. By applying an electrical voltage or an electrical current to a resistor structure of this kind, said structure is heated, and therefore a sensor element 101 102, 103 can also be used as a heating element.

Another method for structuring the functional layer is a 3-D lithography method. The advantage of using the laser ablation method as compared to the 3-D lithography method, however, is that it involves less effort, which results in lower costs and increased environmental friendliness.

Subsequently, a passivation layer 130, especially consisting of a ceramic material, is applied to the functional layer 120 and to the electrical insulation layer 140. Said passivation layer has a layer thickness of approx. 30 μm and is used to protect the functional layer 120 and electrical insulation layer 140 from environmental influences—for example, corrosion.

An alternative embodiment of the sensor element 100 consists in the use of a non-conductive material for the support element 110. In this case, the electrically-insulating layer 140 can be dispensed with, and therefore the functional layer 10 is applied directly to the support element 110.

The thermal flow sensor has at least one sensor element 101. In such a case, the sensor element 101 is used to temporarily, in an alternating manner, heat the measuring medium 2 and to determine the temperature of the measuring medium 2.

It is also possible to use two or more sensor elements 101, 102, 103, especially arranged in the flow direction, wherein one of the sensor elements 101 is designed as a heating element and is arranged centrally, and wherein in each case one of the sensor elements 102, 103 are designed as temperature sensors and are arranged upstream, in the flow direction F, and downstream, in the flow direction F, of the heating element.

A thermal flow sensor 100 of this kind can be operated in the conventional known operating modes, "calorimetric flow measurement," "anemometric flow measurement," and "time-of-flight flow measurement," and, in addition to the sensor elements 100, has an electronics unit (which comprises a control unit and an evaluation unit), a voltage/current source, and wiring.

Calorimetric thermal flow sensors 100 determine the flow or flow rate of the measuring medium 2 in a channel by way of a temperature difference between two sensor elements 102, 103 in the form of temperature sensors, which are arranged downstream and upstream of a sensor element 101 designed as a heating element. For this purpose, use is made of the fact that, up to a certain point, the temperature difference is linear with respect to the flow or the flow rate. This procedure or method is described extensively in the relevant literature.

Anemometric thermal flow sensors consist 100 of at least one sensor element 101 in the form of a heating element, which is heated during the measurement of the flow. As a result of the measuring medium 2 flowing around the heating element, heat is transported into the measuring medium, and this changes with the flow velocity. The flow velocity of the measuring medium can be inferred by measuring the electrical variables of the heating element.

Flow sensors according to the so-called "time-of-flight" measuring principle have at least one sensor element 101 in the form of a heating element, and a sensor element 102, 103 in the form of a temperature sensor. The heating element delivers a brief heat pulse into the measuring medium 2, which causes local heating of the measuring medium 2. The flowing measuring medium 2 causes a movement of the local heating in accordance with the present flow. If the local heating comes into the vicinity of the temperature sensor, this heating is detected by the temperature sensor. An evaluation unit determines the time difference between the induction of the heat pulse and the detection of the local heating by the temperature sensor. The time difference constitutes a measure of the flow velocity of the measuring medium. The lower the time difference, the higher the present flow velocity of the measuring medium 2, and vice versa.

Instead of a sensor element 101, 102, 103 being designed as a heating element, said sensor element may also be designed as a cooling element—for example, a Peltier element. The operating modes described above can likewise be carried out using a cooling element, in which case a cooling pulse is induced in the measuring medium.

In addition to this specific design of a thermal flow sensor 100, it is self-evident to the person skilled in the art that any other designs and types of thermal flow sensor can be used in connection with the method according to the invention, as long as they have a sufficiently high sensitivity. For example, a sensor element 101, 102, 103 which has been applied to a substrate can be soldered with the substrate to the support element 110, which likewise enables high sensitivity.

The invention claimed is:

1. A method for operating a thermal flow sensor, wherein the thermal flow sensor comprises at least one sensor element and an electronics unit, the method comprising:
    putting a measuring medium in thermal contact with the at least one sensor element and periodically heating the measuring medium via an AC voltage introduced into the at least one sensor element;
    simultaneously, detecting a maximum amplitude of a curve of a temperature and/or a phase shift between a curve of the AC voltage and a curve of the temperature;
    adjusting the detected maximum amplitude and/or the detected phase shift using calibration data;
    determining an isoline using the adjusted maximum amplitude and/or the adjusted phase shift based on a mathematical or physical model of the thermal flow sensor, wherein the isoline includes a plurality of value pairs of thermal parameters of the measuring medium, the value pairs being associated with the same maximum amplitude or the same phase shift;
    deriving at least one piece of measuring medium information from the isoline; and
    performing a flow measurement using the thermal flow sensor, wherein the at least one sensor element generates signal values, wherein the signal values are converted using the at least one piece of measuring medium information into measurement values of an effective flow velocity of the measuring medium.

2. The method of claim 1, wherein the thermal parameters are thermal conductivity and heat capacity of the measuring medium.

3. The method of claim 1, wherein the calibration data are determined beforehand with a known measuring medium with a defined value pair of thermal parameters, wherein the determining of the calibration data comprises detecting a reference maximum amplitude of the curve of the temperature and/or a reference phase shift between the curve of the AC voltage and the curve of the temperature.

4. The method of claim 3, wherein the known measuring medium is water.

5. The method of claim 3, wherein the flow velocity of the measuring medium or of the known measuring medium is zero when detecting the maximum amplitude and/or the phase shift and when determining the calibration data.

6. The method of claim 3, wherein, for determining the calibration data, the thermal flow sensor is temporarily connected to a calibration device, which includes a pipeline, or a channel, and a pump, and wherein the pump establishes a flow through the pipeline or channel with the known measuring medium with the defined value of the flow velocity.

7. The method of claim 1, wherein the calibration data are stored in the electronics unit.

8. The method of claim 1, wherein the flow measurement is performing using a constant temperature anemometry.

9. The method of claim 1, wherein the determining of the isoline and the deriving of the measuring medium information from the isoline are repeated when one or more of the following occurs:
    a switch or change of the measuring medium;
    a check of the at least one sensor element with respect to soiling; and
    a change in a composition of the measuring medium.

10. The method of claim 9, wherein the change in the composition of the measuring medium includes decomposition of the measuring medium.

11. The method of claim 1, wherein the determining of the calibration data, the determining of the isoline, and the deriving of the measuring medium information from the isoline are repeated when a fault occurs in the thermal flow sensor.

12. The method of claim 1, wherein to determine the isoline and carry out the flow measurement, the thermal flow sensor is mounted on a pipeline through which the measuring medium flows or in a channel of a measuring point.

13. The method of claim 1, wherein the detecting of the maximum amplitude or the phase shift is repeated periodically, and wherein a warning is generated by the electronics unit when the respectively detected maximum amplitudes or phase shifts differ from each other by more than a predetermined limit.

14. A thermal flow sensor, comprising:
    at least one sensor element; and
    an electronics unit,
    wherein the at least one sensor element and the electronics unit are configured to be operated by the method according to claim 1.

* * * * *